| | A | B.B' | C.C' | D | E | F.F' | G.G' | H | I |
|---|---|---|---|---|---|---|---|---|---|
| LS7 | + | − | − | − | + | + | − | − | − |
| LS8 | − | + | − | − | − | − | − | − | − |
| LS9 | − | − | + | − | − | − | − | − | − |
| LS10 | + | + | − | − | − | − | − | − | + |
| LS11 | − | − | − | − | + | − | − | − | − |
| LS12 | − | − | − | − | − | − | + | − | − |
| SOL7 | − | − | − | + | − | − | − | − | − |
| SOL8 | − | + | + | + | + | + | + | − | − |
| SOL9 | − | − | + | + | + | + | + | − | − |
| SOL10 | − | − | − | − | − | − | − | + | − |
| SOL11 | + | + | + | + | − | − | + | + | + |
| SOL12 | + | + | + | − | − | − | + | + | + |
| TR | − | − | + | − | − | − | + | − | − |

|  | A | B,B' | C | D | F | G,G' | H | I | K |
|---|---|---|---|---|---|---|---|---|---|
| LS13 | − | − | − | − | − | + | − | − | − |
| LS14 | − | + | − | − | − | − | − | − | − |
| LS15 | + | + | − | − | + | + | − | − | + |
| TR1 | − | − | − | − | − | + | − | − | − |
| TR2 | − | − | − | − | − | + | + | − | − |
| TR3 | − | + | − | − | − | − | − | − | − |
| TR4 | − | + | + | − | − | − | − | − | − |
| SOL13 | − | − | + | + | + | + | − | − | − |
| SOL14 | − | + | + | + | − | + | + | + | − |
| SOL15 | − | − | − | + | − | − | − | + | − |

Oct. 15, 1968  TAMAKI TOMITA  3,405,522
HYDRAULIC MOTOR CONTROL CIRCUIT
Filed Nov. 23, 1965  8 Sheets-Sheet 6

United States Patent Office 3,405,522
Patented Oct. 15, 1968

3,405,522
HYDRAULIC MOTOR CONTROL CIRCUIT
Tamaki Tomita, Okazaki, Japan, assignor to Toyoda
Machine Works Ltd., Aichi Prefecture, Japan
Filed Nov. 23, 1965, Ser. No. 509,393
Claims priority, application Japan, Nov. 25, 1964,
39/66,335; Aug. 9, 1965, 40/48,349
6 Claims. (Cl. 60—52)

ABSTRACT OF THE DISCLOSURE

A hydraulic motor control circuit having at least two oil pressure convertors including a pressure operated device and a pressure oil feeding device directly driven by the pressure operated device. The pressure operated device is supplied from a pressure fluid source provided with a relief valve, the pressure oil feeding device being operated to feed at least one hydraulic motor with cold pressure oil pumped from a separate heat insulated reservoir, the pressure of said cold oil being established only by the pressure of the pressure fluid for the pressure operated device. The pressure operated device works alternately without interruption and constantly drives at least one of the pressure oil feeding devices in order to supply a necessary quantity of cold pressure oil in response to the requirement of the hydraulic motor.

---

The present invention relates to hydraulic motor control circuits.

According to the invention there is provided a hydraulic motor control circuit comprising at least one oil pressure convertor consisting of a pressure operated device and a pressure oil feeding device directly driven by said pressure operated device, said pressure operated device being supplied from a pressure fluid source having a controlling valve, said pressure oil feeding device being operated to feed at least one hydraulic motor with cold pressure oil pumped up from a separated heat-insulated reservoir, the pressure of said cold pressure oil being established only by the pressure of the pressure fluid for said pressure operated device so as to permit said pressure oil feeding device to discharge continuously necessary quantity of cold pressure oil in response to the requirement of said hydraulic motor.

The effects obtainable from the above-mentioned control circuit by the present invention are as follows:

(1) The working piston of a pressure operated device of the convertor is operated with "hot pressure oil" discharged from any known pumping means. However, the feeding piston of a pressure oil feeding device of the convertor directly driven by said working piston discharges only the required quantity of cold pressure oil (room temperature pressure oil which is cold compared to said hot pressure oil), and the energy converted into heat is extremely low. Accordingly, when cooling effects of the oil tanks and leading pipes are taken into consideration, substantially no temperature rise occurs.

(2) As the hot pressure oil operating the working pistons of the pressure operated device of the convertor circulates in a large quantity, rapid rises in temperature occur necessarily. Since, however, such is not operational oil for driving the hydraulic motors, the grade of oil may be selected from oils of the best temperature characteristics. Furthermore, as the cold pressure oil to drive the hydraulic motors shows no temperature rise, an oil of the best stability in the behavior of driving the hydraulic motors may be used.

(3) The working piston of the pressure operated device of the convertor is operated with hot pressure oil established at constant pressure by a relief valve, and the cold pressure oil is discharged by the distinct feeding piston directly driven by said working piston. In consequence, the cold pressure oil is not substantially affected by pumping pulsations of the discharged hot pressure oil and pulsations of the hot pressure oil due to chattering of the relief valve, because such pulsations are absorbed by the working cylinder and the feeding cylinder.

(4) The pressure of the cold pressure oil may be established at a specific value by appropriately selecting the ratio of area of the operational cylinder and the feeding cylinder of the oil pressure convertor.

In particular, when compressed air is used instead of hot pressure oil, there is an advantage that a cold stabilized pressure oil of high pressure can be obtained by means of compressed air of low pressure.

In the following, the present invention is further described in detail in connection with the accompanying drawings, in which.

Figure 1:
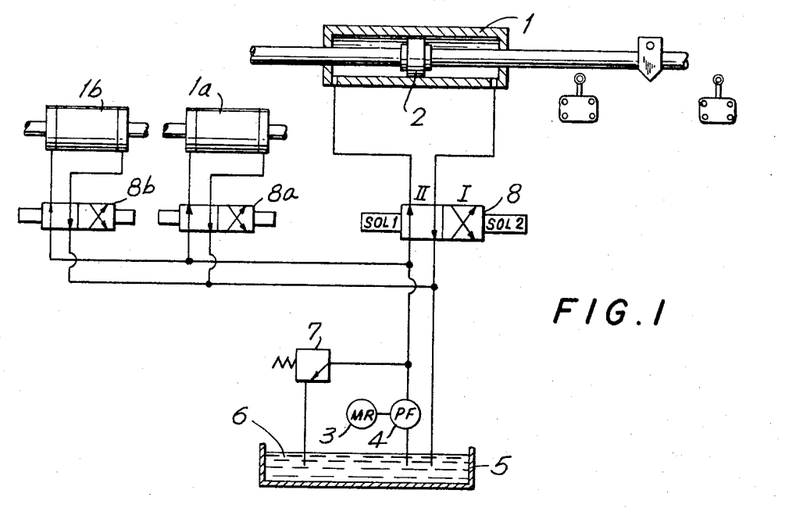
FIG. 1 shows a main part of pressure oil circuit of known oil pressure apparatus.

As shown in FIG. 1, in known oil pressure apparatus, the operational oil is pumped out of oil tank 5 by pump 4 driven by electric motor 3. The oil under pressure is supplied to hydraulic motors 1, 1a and 1b via valves 8, 8a and 8b. In general, the amount of pressure oil required per unit time for driving hydraulic motors 1, 1a and 1b is proportional to the velocity of displacement of piston 2 to be driven.

For instance, in a feeding device using hydraulic motors for machine tools, a cycle of quick feeding—fine feeding—quick returning of the tool is repeated by the tool feeding means. Even when numbers of feeding means are provided and all the feeding means are started simultaneously, the necessary amount of oil in one cycle shows a temporary peak in the period of quick feeding, and in the remaining period the amount is generally reduced to an extremely small amount. Even when the necessary amount of oil varies in the hydraulic motor, the amount of pumping per minute should be kept above the necessary amount of oil per minute at the peak of the necessary amount of oil, in order to keep the pressure of the pumped oil substantially constant. If the amount of oil is insufficient, the hydraulic motor will show unsatisfactory operation which would cause an unexpected accident.

Accordingly, in known oil pressure apparatus, pumps are used having a delivery capacity above the maximum necessary discharge of operational oil.

Except for peaks in the demand of oil, a large amount of residual pressure oil is returned to an oil tank 5 through a relief valve 7 (FIG. 1). For most of one cycle of hydraulic motors 1, 1a and 1b, the operational oil circulates through the pump, the relief valve, and the oil tank in a large quantity of flow.

Thus, during the circulation of operational oil, the energy of the pressure oil is converted to heat which raises the temperature of the oil rapidly, resulting in a hot oil.

This temperature rise causes thermal expansion of the structure on which the hydraulic motors are mounted, and further changes the viscosity of the operational oil. Due to the rise of oil temperature, the precision of machine tools using oil pressure is upset and a constant thermal expansion is obtained by virtue of heating the pressure oil in advance to the admissible maximum value. The above-mentioned method is called "pre-running" of the machine tools, and usually involves an extended period of time, as much as two or three hours, which is non-productive time. If no pre-running is effected, the working-precision will be varied with the time elapsed, which constitutes a considerable inconvenience. A further cause for the rise in the temperature of the operational oil is frictional heat due to high speed rotation of the rotor of the pump.

An object of the present invention is to eliminate the disadvantages referred to above.

Figure 2:
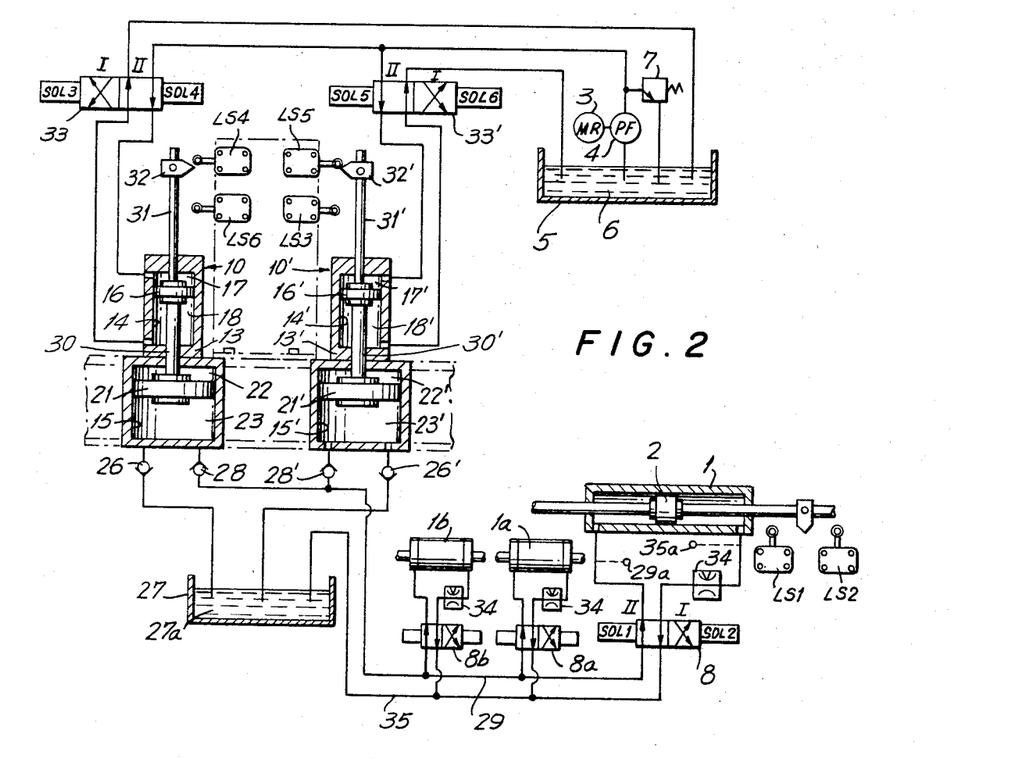
FIG. 2 shows a main part of a basic example of hydraulic motor control circuits according to the present invention.
Figure 3:
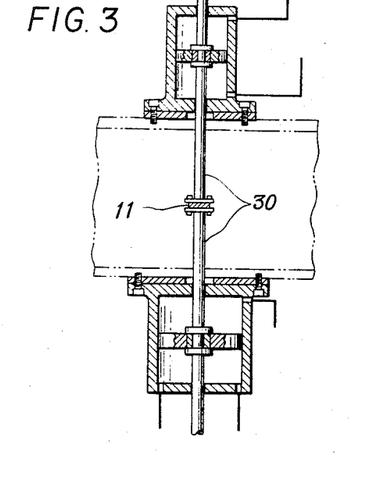
FIGS. 3 and 4 show different means of connection between the pistons of working cylinders and the pistons of feeding cylinders illustrated in FIG. 2.
Figure 4:
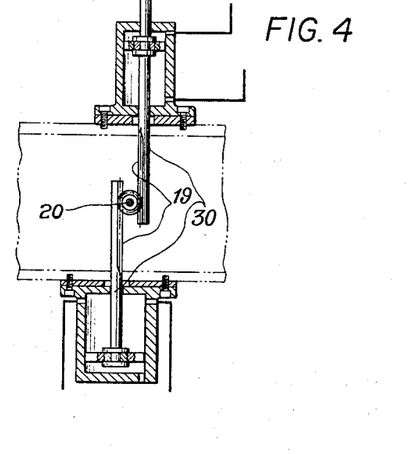

As shown in FIG. 2, 10 and 10' represent a plurality of oil pressure convertors of identical shape (hereafter, descriptions relating to the construction are represented by 10). In the oil pressure convertor, the working cylinder 14 is connected as one body with the feeding cylinder 15, and a piston 16 slidably mounted in the working cylinder 14 is connected with a piston 21 slidably mounted in the feeding cylinder 15, by means of a piston rod 30. An intermediary heat-insulating material 11 may be interposed in piston rod 30 as seen in FIG. 3. The piston rod may be formed in two parts joined by rack 19 and pinion 20 as illustrated in FIG. 4. In all arrangements, however, it is essential that the two pistons 16, 21 work together.

The pressure oil discharged from a pump 4 driven by an electric motor 3 establishes the pressure by means of a relief valve 7, and the directions of flow of the pressure oil are selected by a changeover valve 33 so that the pressure oil is allowed to enter or leave the front chamber 18 and rear chamber 17 of the working cylinder 14 in order to advance or retract the piston 16. The discharge quantity per unit time of pump 4 is selected somewhat larger than the maximum value of pressure oil consumption per unit time of cylinder 14, and the remaining pressure oil is returned to the oil tank 5 through the relief valve 7, excepting when the displacement velocity of the piston 16 is maximum. That is, as the discharge quantity of pump 4 is sufficient, consequently, ample pressure oil can be supplied to the working cylinder 14 following the displacement velocity of piston 16. Moreover, the pressure oil can be supplied to the working cylinder without altering the pressure of the pressure oil established by the relief valve 7. Since the discharge quantity of pump 4 is above the quantity of oil required by the working cylinder 14, the excessive working oil of somewhat large quantity circulates in the circuit of pump-relief valve-oil tank, causing a rise of the oil temperature due to friction.

By actuation of limit switches LS3, LS4, LS5, LS6, the operational range of working cylinder 14 is changed, by cooperation with a dog 32 secured to a rod 31 projecting through the outer portion of the cylinder from the rear end of piston 16.

The number and arrangement of said limiting switches are selected according to the operational orders of the working cylinders. For instance, in case that two oil pressure convertors 10, 10' are to be controlled as shown in the operational locus by FIG. 5, the limit switches are located at a position corresponding to the rear retreated end of piston 16, 16' and at the position corresponding to the middle point of the stroke.

An oil tank 27 is provided for containing "cold oil" to actuate the oil pressure motor 1. This oil tank is arranged as a distinct tank independent from said oil tank 5 containing "hot oil" or as a juxtaposed tank separated adiabatically from said oil tank 5 to prevent heat conduction therefrom. The driving oil 27a in the oil tank 27 is fed to the front chamber 23 of the feeding cylinder 15 through a nonreturn valve 26 opening on the suction side, and the driving oil 27a is drawn into the chamber 23, when piston 21 moves upward. Further, the hydraulic motor 1 is fed from the front chamber 23 of the feeding cylinder 15 through a nonreturn valve 28 and appropriate change-over valve 8. Hence, when the piston 21 is pushed down, the pressure oil in the front chamber 23 is thereby supplied to the hydraulic motor 1.

As the oil pressure convertor 10 is exposed to negative pressure when piston 21 is shifted from forward stroke to backward stroke, at least two sets of such convertors are necessary. Moreover, when one of the pistons of the convertors is shifted as above-mentioned, the other oil pressure convertor must continue to discharge the pressure oil in order to compensate said negative pressure. The actual means therefor will be described in connection with FIG. 2 and FIG. 5.

Figure 5:
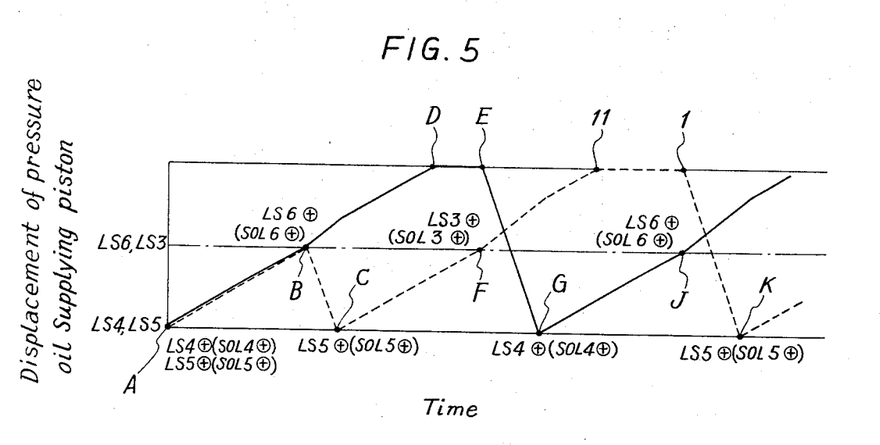
FIG. 5 represents the locus of the pistons of working cylinders of FIG. 2, wherein the displacement amount of pistons is shown in the ordinate, and the lapse of time is shown in the abscissa.

In FIG. 5, the operational locus of pistons 16 or 21 of the oil pressure convertor 10 in FIG. 2 are shown in full lines, while the locus of pistons 16' or 21' of oil pressure convertor 10' is shown in dotted lines. When pistons 16, 16' of the convertors 10, 10' begin to advance from the original positions A at the same time, and when the limit switches LS3, LS6 are operated in the middle B of the advance stroke of the piston (in reality, they are not operated at the same time, but one is leading), and when the limit switch LS6 is operated and SOL6 is energized, the change-over valve 33' is operated and piston 16' begins to retreat (as the retreating time corresponds to the suction of oil, returning occurs sooner), and when limiting switch LS5 is operated at the rear retreated end C, SOL5 is energized and advance is resumed.

During this time, the piston of oil pressure convertor 10 continues to proceed from the position B as it is, and halts for a while at the advance end D; in the course of advance of dog 32' of oil pressure convertor 10', LS3' operates, SOL4 is energized and the piston 16 commences to retreat, and LS4 is operated at the retreated end G and SOL4 is energized, and the change-over valve 33 is operated and advance is resumed. Thus, when either one of the oil pressure convertors operates limit switches LS3, LS6 provided at the middle of the stroke on the way to advance, the remaining oil pressure convertor begins to retreat. Therefore, the oil pressure convertors can always discharge the pressure oil, without interruption, and the pressure oil is continuously supplied to the hydraulic motors.

Figure 6:
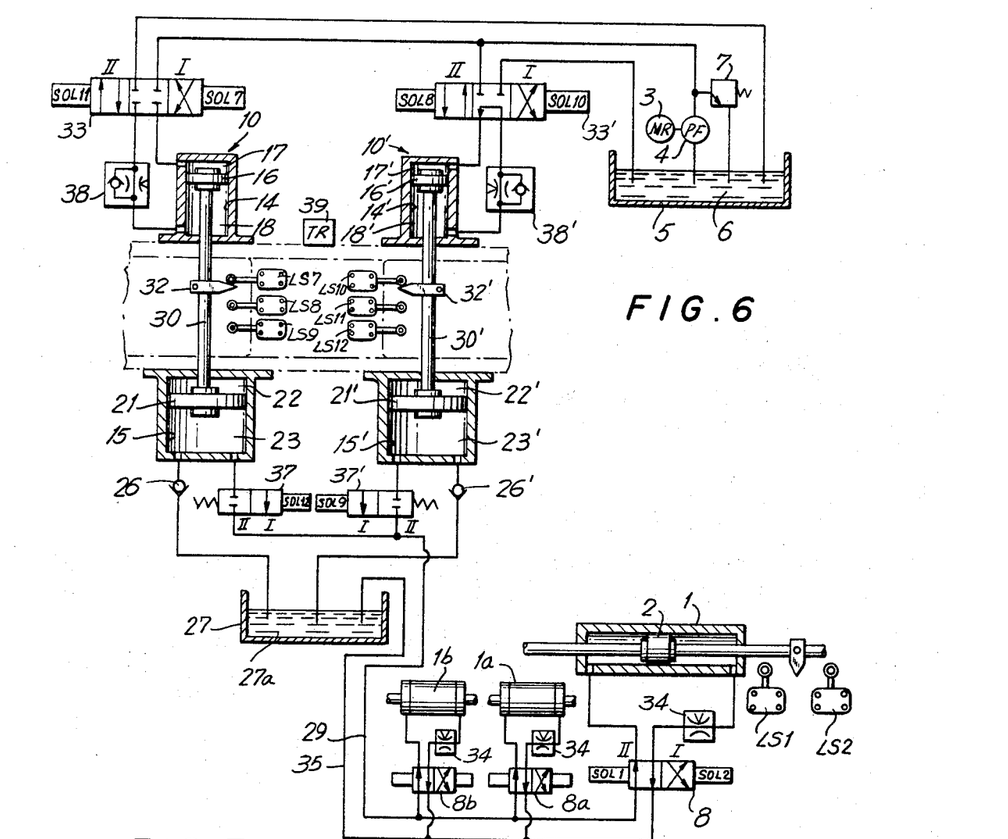
FIGS. 6, 9, 12, 15 and 16 show other examples of hydraulic motor control circuits according to the invention.

In FIG. 6, the arrangement of FIGURE 2 is slightly modified, the distance between the operational cylinders 14, 14' and feeding cylinders 15, 15' being extended and a cooling effect imparted to piston rods 30, 30' connecting the pistons 16, 16' to 21, 21' of the two sets of cylinders. Also limit switches to change the directions of pistons 16, 16' of working cylinders 14, 14', are provided at the retreated end, the advance end of pistons 16, 16' and the middle portion of the stroke, and closing valves 37, 37' are used in place of nonreturn valves 28, 28' of FIG. 2.

Figure 7:
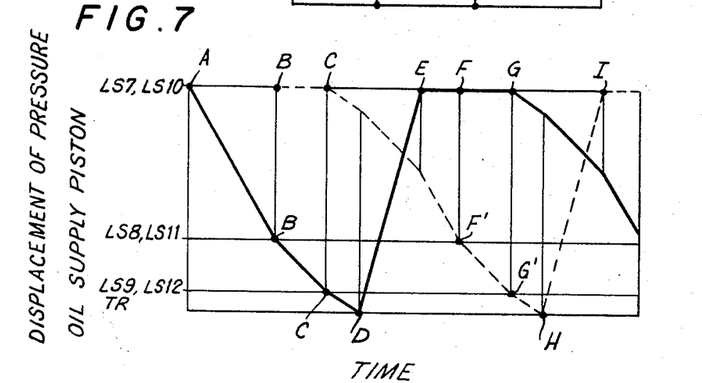
FIG. 7 represents the locus of the pistons of working cylinders of FIG. 6.

The characteristics of the embodiment shown in FIG. 6 are as shown by the operational locus in FIG. 7, the next oil pressure convertor being designed to begin operation near the end of operation of one of the two oil pressure convertors. The construction is fundamentally the same with that of FIG. 2. Similar symbols represent similar actions and effects.

Figure 8:
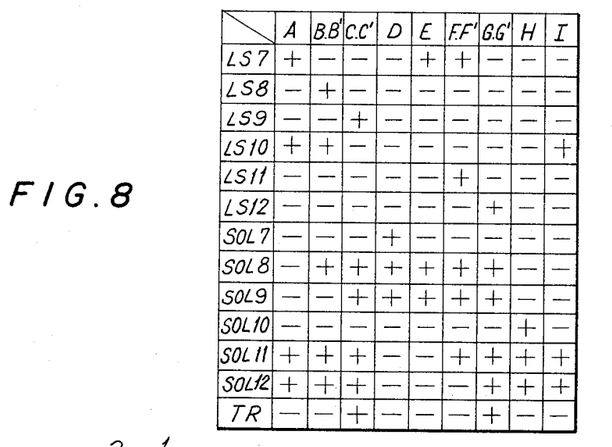
FIG. 8 and FIG. 11 represent the actuation conditions of the limit switches, the solenoids of the change-over valves and the timers at all points of FIG. 6 and FIG. 9, FIG. 8 corresponding to FIG. 6 and FIG. 11 corresponding to FIG. 9, respectively.
Figure 9:
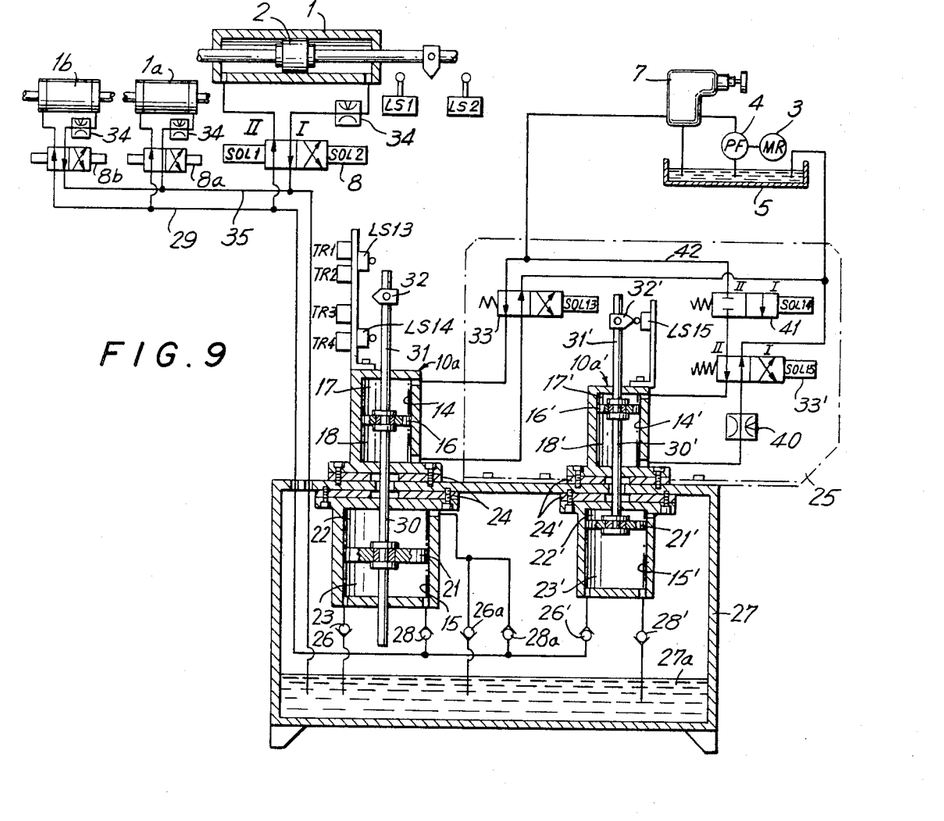

In the following, the operation of FIG. 6 is described: First, SOL11, SOL12 are energized by devices such as starting buttons to operate the oil pressure convertor 10, and the limiting switch LS8 is operated at B on the way of advancement to energize SOL8 and operate the change-over valve 33' to feed pressure oil in the rear chamber 17' of the working cylinder 14' and to generate pressure in the front chamber 23' of the feeding cylinder 15' (pressure oil is not discharged, because stop valve 37' is being closed). When the piston 21 reaches near the advance end C, limit switch LS9 is operated to open the stop valve 37' and simultaneously the oil pressure convertor 10' begins to feed pressure oil and simultaneously the timer TR is energized, and when the established fixed period of time is passed, the change-over valve 33 is changed to Port I and the piston 16 of the oil pressure convertor 10 begins to retreat conducting the suctioning operation of driving oil (cold oil) in the front chamber 23 of the feeding cylinder. During this time, the oil pressure convertor 10' continues to feed pressure oil and near its final end the oil pressure convertor 10 resumes its operation. These operations will be understood from FIGS. 7 and 8. FIG. 9 shows an embodiment of the invention, wherein the driving pressure oil is supplied continuously by using one oil pressure convertor 10a and one auxiliary oil pressure convertor 10a'. The oil pressure convertor 10a may be regarded as fundamentally identical with the oil pressure convertor 10 of FIG. 2, the difference between the two being that the piston 21 of the feeding cylinder 15 is the type of operating on both sides, while the front chamber 23 and rear chamber 22 are in communication respectively with cold oil contained in the oil pressure tank 27 through nonreturn valves 26, 26a opening to the suction side, and also in communication with a passage 29 leading to the hydraulic motors 1, 1a and 1b through nonreturn valves 28, 28a opening to the discharge side.

The auxiliary oil pressure convertor 10a' may be considered as a smaller sized version of the oil pressure convertor 10 shown in FIG. 2, and the function and effect are similar. The symbols for individual parts are designated the same for convenience sake.

When both the working cylinder 14 of the oil pressure convertor 10a and the working cylinder 14' of the auxiliary oil pressure convertor 10a' are driven with pressure oil of the same pressure, all parts of auxiliary pressure oil convertor 10a' are manufactured on reduced sizes of fixed proportion, in order that the pressures of the pressure oils discharged from both feeding cylinders 15 and 15' may be the same. Further, the front chamber 23' is in communication with cold oil in oil tank 27 through nonreturn valve 28' opening to the suction side, and also communicates with said passage 29 through nonreturn valve 26' opening to the discharge side. The method of driving the working cylinders 14, 14' is not basically different from that shown in FIG. 2. Limit switches LS13, LS14, LS15 play similar roles as shown in FIG. 2. There is a characteristic feature in the control of timers, in which a stop valve 41 and timers TR1, TR2, TR3 and TR4 are newly provided.

Figure 10:
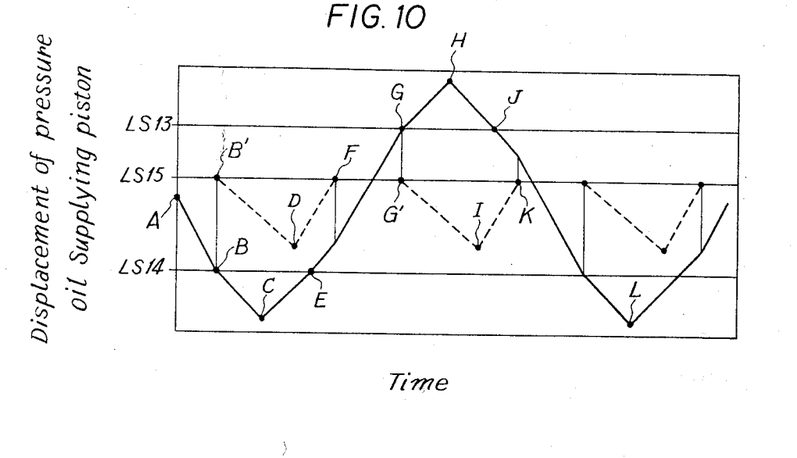
FIG. 10 represents the locus of the pistons of FIG. 9.
Figure 11:
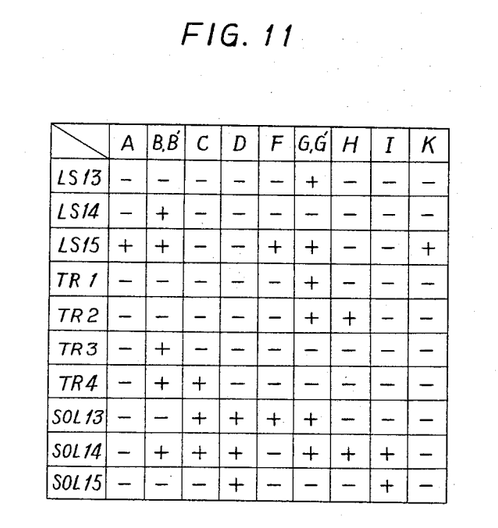

The operations will be described referring to FIG. 9, FIG. 10, and FIG. 11. Pressure oil is fed in the rear chamber 17 of the working cylinder 14 through valve 33 to move the piston 16; cold pressure oil is discharged to the hydraulic motors 1, 1a and 1b from front chamber 23 of the feeding cylinder 15 to suck cold oil into the rear chamber 22.

When the piston 16 advances to B point near the advance end, the timers TR3, TR4 and SOL14 are energized by actuating limit switch LS14 by means of dog 32. The pressure oil is fed also to the rear chamber 17' of the working cylinder 14' of the auxiliary oil pressure convertor 10a' through stop valve 41 and change valve 33' to cause the piston 16' to begin to advance, with the result that the oil in the front chamber 23' of the feeding cylinder 15' is discharged and flows together with the pressure oil discharged from the oil pressure convertor 10a.

After the predetermined time, the timer TR3 reaches C point to energize SOL13 for operating the change switch 33, and the pressure oil is fed to the front chamber 18 to begin the retreat of the piston 16, and as a result, pressure oil is discharged from the rear chamber 22 of the feeding cylinder. The timer TR4 is energized at a time a little later from the period at which the piston 16 is shifted from the advancement to retreating, energizing SOL15 to operate the change-over valve 33' (at D-point), with the result that the piston of the auxiliary oil pressure convertor is retreated, and when limit switch LS15 is operated at the end of retreating F, SOL14 is deenergized to close again the passage by operating the stop valve 41.

The piston 16 continues to retreat and operate limit switch LS13 near the end of retreating, thereby energizing SOL14, timers TR1 and TR2 to open the stop valve 41 and again operate the auxiliary oil pressure convertor 10a'. Then, the piston 16 is shifted from the retreating to the advancement as TR1 comes to the end of its time setting. The auxiliary oil pressure convertor 10a' returns to the original position. Similar operations are repeated hereafter.

The difference between the operations as shown in FIG. 9 and FIG. 2 is as follows: In the embodiment shown in FIG. 9, pressure oil is continuously fed to the hydraulic motors through a single oil pressure convertor, and during the time when the working cylinder changes direction between advance or retreat, pressure oil is fed by the auxiliary oil pressure convertor to avoid variations in pressure during the change-over period.

In the embodiments shown in FIG. 2 to FIG. 11 referred to above, pressure oil is used as a medium for operating the working cylinders 14, 14' in all the cases. However, compressed air may be used in lieu of pressure oil.

In the method of using the compressed air, in lieu of the pump 4, an air-compressor is used; and in lieu of a relief valve 7, an air-regulator is used respectively, and compressed air may be supplied to the working cylinder 14 via an air-change-over valve. As the pressure of compressed air can not be generally raised to a high pressure at high efficiency, the pressure oil discharged from the feeding cylinder 15 is disadvantageously affected in both the pressure and flow quantity largely by the size of the oil pressure convertor 10. Electric appliances, such as limit switches and electromagnetic valves or the like, have a disadvantage in that the life of the contact points is short and liable to cause accidents. However, if all the operational elements are as seen in the embodiment of FIG. 12, reliability against accidents will be increased.

Figure 12:
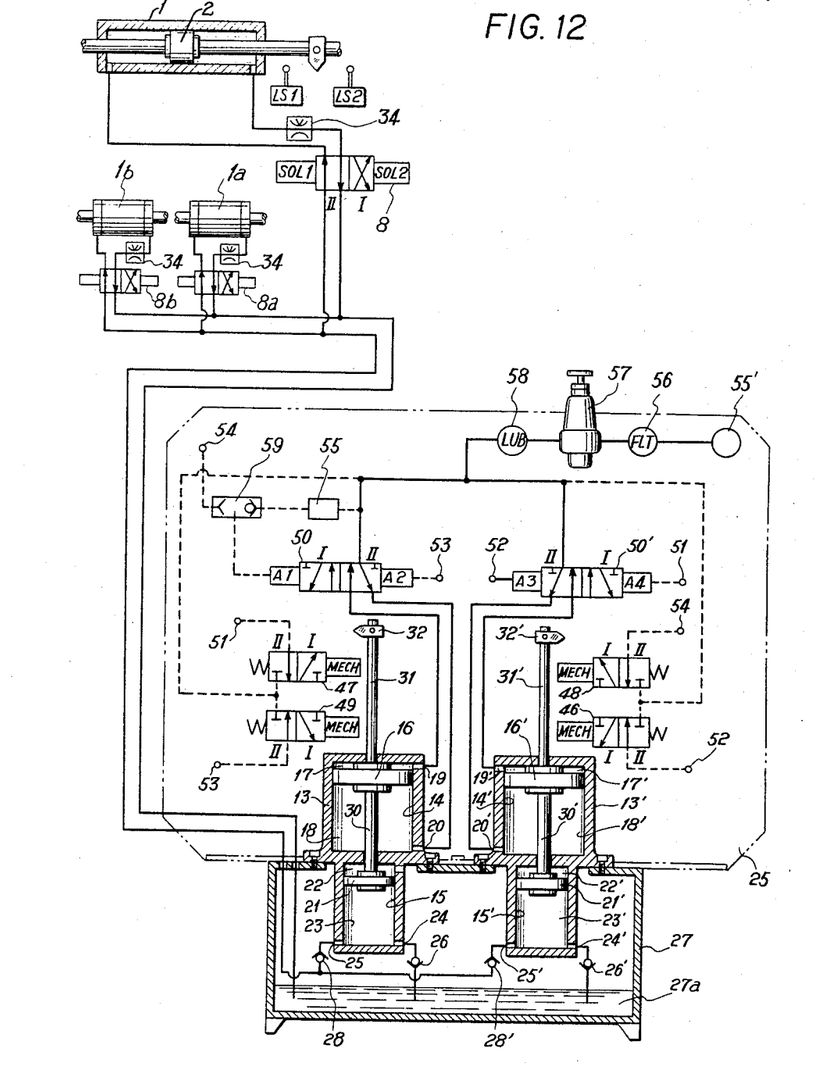

FIG. 12 may be considered as corresponding to FIG. 2.

FIG. 12 will be explained as follows:

Comparing FIG. 12 with FIG. 2, mechanical change-over valves 46, 47, 48 and 49 correspond to limit switches LS3, LS4, LS5 and LS6 respectively. Moreover, differential pneumatic change-over valves 50, 50' operate similar to change-over valves 33, 33' of FIG. 2 respectively. Namely, if similar points in both the passages of the mechanical change-over valves and passages of the air pilots for changing-over of the differential pneumatic type change-over valves, such as 51—51, 52—52, 53—53, 54—54 are connected, the mechanical change-over switch and change-over switch 47 being changed over to I-port, the differential pneumatic change-over valve 50' is changed over to I-port and hereinafter if change-over valve 49 is changed-over to I-port similarly, change-over valve 50 is changed over to II-port, and if change-over valve 48 is changed over to I-port, change-over valve 50 is changed over to I-port, and if change-over valve 46 is changed over to I-port, change-over valve 50' is changed over to II-port. Furthermore, the change-over valve 50 is also changed over to I-port by operating the valve 55 for starting.

Now, the operation of FIG. 12 will be explained briefly. (The drawing indicates the original position.) Compressed air compressed by an air-compressor 55' is filtered by filter 56 and is passed to differential pneumatic change-over valves 50, 50' through an air-lubricator 58 after its pressure has been appropriately established by an air-regulator 57, and is supplied to the front chamber 18 of the working cylinder 14 from this II-port.

By operating the starting valve 55 and communicating the pilot air into a pilot chamber A1 by means of two direction check valve 59, the said valve is then changed over to I-port and compressed air is supplied to the rear chamber 17 of the working cylinder 14 and piston 16 begins to descend. During descent, mechanical change-over valve 47 is changed-over by dog 32 to place the pilot air in communication with pilot chamber A4 from passage 51, and change-over valve 50' is changed over to I-port, and the piston 16' of the working cylinder 14' begins to descend. The piston 16 advances until near the end of its stroke, where mechanical change-over valve 49 is operated thereby. Then, the change-over valve 50 is changed-over to make piston 16 retreat and stop at the retreat end. When mechanical change-over valve 48 is operated by dog 32', the change-over valve 50 is changed over to resume the advance of the piston 16. When mechanical change-over valve 46 is operated by dog 32', change-over valve 50' is changed-over to retreat the piston 16'. Thus, pistons 16 and 16' repeat the advancing and retreating operations alternately, to discharge pressure oil from the feeding cylinders 15, 15'. The state of operation will be sufficiently understood by referring to FIG. 2.

Figure 13:
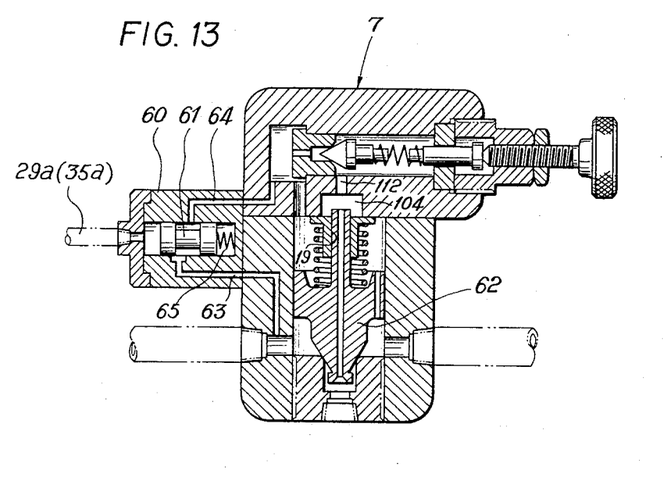
FIG. 13 is a sectional view of a special type relief valve comprising feedback means utilized in the circuits by the invention.

A more particular embodiment of this invention is illustrated in FIG. 13. The object of this embodiment is to control the pressure of pressure oil or compressed air supplied to the working cylinder 14 according to the loading conditions of the hydraulic motors. Namely, as "cold pressure oil" fed to the hydraulic motors 1, 1a and 1b is discharged from the oil pressure convertors 10, 10' driven by "hot pressure oil" supplied by the ordinary pump 4, there is a danger that the relief valve 7 or air-regulator 57 could not sufficiently follow it when the pressure in the supply passage of the "cold pressure oil" is subjected to abnormal fluctuations.

In order to make the pressure compensating action of relief valve 7 or air-regulator 57 more sensitive, in FIG. 13, a pressure compensating spool valve 60 is provided on the side of the known relief valve 7, and one end of slidable spool 61 is acted on by a spring 65 and the other end is in communication with a pilot line 29a provided in a feeding passage for "cold pressure oil" in FIG. 2 or a pilot line 35a of pressure oil discharging passage 35.

The intermediate valve portion of spool 61 serves to throttle at the middle a passage 63 extending to the lower side of a pressure controlling piston 62 of relief valve 7 and a passage 64 extending to the upper side thereof.

Thus, in the relation of the position where the oil pressure in the left-hand compartment of spool 61 is balanced with the spring force of the right-hand compartment, for the purpose of controlling the oil pressure acting on the upper side of piston 62, if the pressure of "cold pressure oil" operating the hydraulic motor 1 rises abnormally, the spool 61 is pushed to the right to decrease the pressure acting on the upper side of piston 62 for moving it up, thereby increasing the quantity of "hot pressure oil" returning to its oil tank to reduce the working pressure of "hot pressure oil." In case when the pressure of "cold pressure oil" becomes abnormally low, the pressure of "hot pressure oil" is also raised similarly as above.

Thus, by direct feeding back of the abnormal rise of the pressure of "cold pressure oil" to the relief valve establishing the pressure of "hot pressure oil," the pressure following property of the apparatus can be greatly improved.

Figure 14:
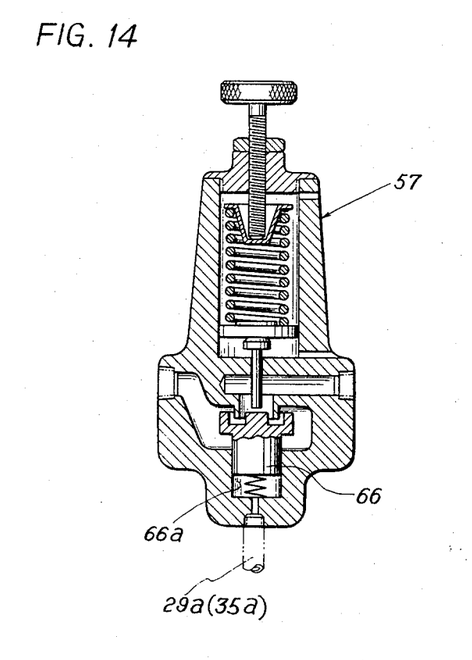
FIG. 14 is a sectional view of a special type air regulator for controlling the pressure of compressed air in another example of the invention.

Also when an air-regulator is used, with similar view, as shown in FIG. 14, the known air-regulator 57 is provided with a compartment 66a connected to pilot line (29a or 35a) under the lower surface of its pressure controlling piston 66, whereby the effect of abnormal increase or decrease of the pressure of "cold pressure oil" is directly supplied as a feedback through said pilot line to the working pressure of compressed air supplied through said air-regulator 57.

Figure 15:
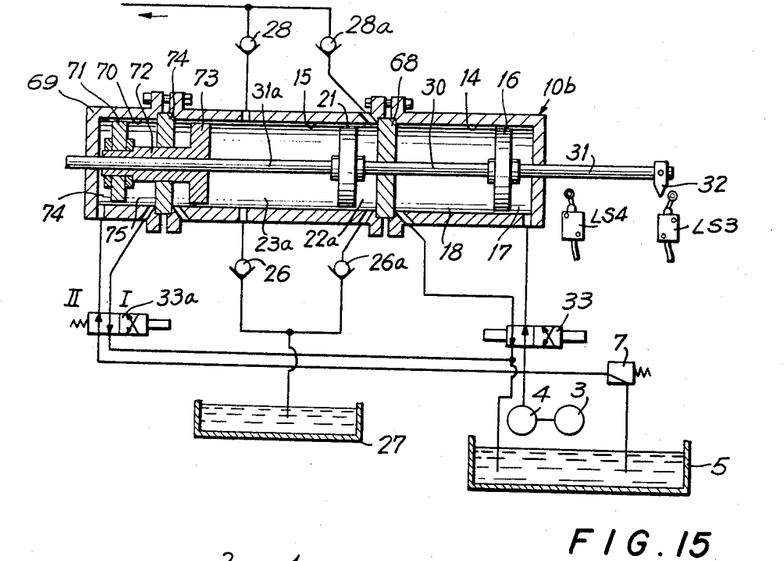

FIG. 15 is a modified embodiment of FIG. 9.

The oil pressure convertor (10b) may be considered as the oil pressure convertor 10 and auxiliary oil pressure convertor 10a' laterally connected. Namely, an operating cylinder 14 separated by a heat insulating wall 68 is fixed to the right hand side of feeding cylinder 15, and on the left hand side is connected an auxiliary cylinder 70 separated by a heat-insulating material 74, and the piston 16 of the working cylinder is connected with the piston 21 of the feeding cylinder by means of piston rod 30. On the other hand, projecting rod 31 and 31a penetrating outside are provided respectively on the right hand side of piston 16 and on the left hand side of piston 21, dog 32 being fixed on rod 31, and rod 31a is inserted slidably in the piston 73 and piston rod 72. The piston 71 inserted in auxiliary cylinder 70 is connected with piston 73 inserted in feeding cylinder by piston rod 72. Hence, when piston 21 inserted in feeding cylinder is pushed to the left by piston 16 or when piston 73 is pushed to the right by piston 71, "cold pressure oil" in the intermediate chamber 23a opens the non-return valve 28 and is discharged to a hydraulic motor. During this time, "cold pressure oil" is sucked from oil pressure tank 27 into a compartment 22a between the piston 21 and heat-insulating wall 68 by opening of non-return valve 26a. Further, when piston 21 is moved to the right, or when piston 73 is moved to the left, the non-return valve 26 is opened to suck "cold pressure oil" into compartment 23a, simultaneously "cold pressure oil" in compartment 22a opening the nonreturn valve 28a to discharge "cold pressure oil." The remaining symbols having no illustration, but coincident with those of FIG. 9 are those showing the same function and effect.

Figure 16:
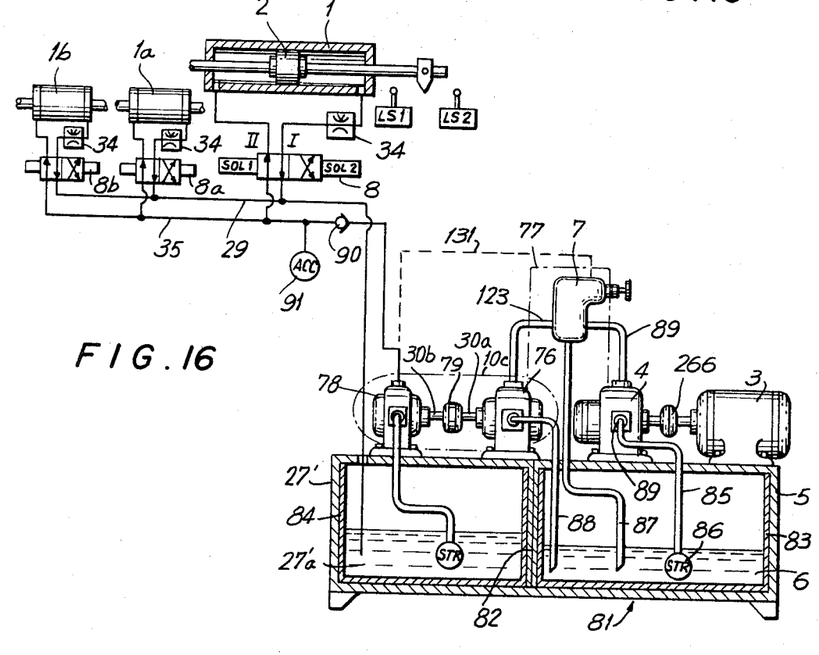

FIG. 16 shows an embodiment comprising an oil pressure convertor consisting of a rotary oil motor and a rotary feeding pump.

In all embodiments from FIG. 2 to FIG. 15, the oil pressure convertor 10 utilizes the working cylinder 14 and the feeding cylinder 15 effecting linear movements of their pistons. Namely, the piston 16 of the working cylinder 14 is operated by hot pressure oil and cold pressure oil is discharged from piston 21 of the feeding cylinder 15. The oil pressure convertor 10c of the embodiment of FIG. 16 has a construction wherein output shaft 30a of a known rotary oil motor 76 is connected with driving shaft 30b of a rotary feeding pump 78 by coupling 79, and is adapted such that cold pressure oil is discharged from said feeding pump 78 and a nonreturn valve 90 is opened to feed the hydraulic motor 1. There is shown a pressure accumulator 91 for reducing pulsation of pressure oil. Furthermore, in the embodiment, elements having the same symbols as those in FIG. 2 have the same function and effect.

In the following, the operations of the embodiment shown in FIG. 16 will be described. The pump 4 is driven by electric motor 3 so as to suck oil 6 in oil tank 5 through strainer 86 and intake pipe 85 and to discharge it to oil feeding pipe 89. The pressure oil thus discharged is established to a fixed pressure through relief valve 7, and supplied to the rotary oil motor 76. The pressure oil passing through relief valve 7 is fed almost entirely to the rotary oil motor 76 when said rotary oil motor 76 revolves at its highest speed, while in other cases it is recirculated to oil tank 5 through exhaust pipe 87. As described later, as the time required for the rotary oil motor revolving at substantially the highest velocity, while the oil pressure motor 1 performs one cycle, is rather short, the flow quantity of pressure oil returning to the oil tank from relief valve 7 through exhaust pipe 87 becomes large, and the oil in oil tank 5 becomes "hot pressure oil" rapidly.

The pressure oil supplied to the rotary motor 76 produces a torque proportional to the pressure of said pressure oil on its output shaft 30a, and the exhaust oil returns to the oil tank 5 through exhaust oil pipe 88. The driven shaft 30b of the rotary feeding pump 78 is rotated with the predetermined torque, by output shaft 30a of the rotary oil motor.

Oil tank 27' is provided with insulating material 83, 84 to prevent heat transfer from oil tank 5. The cold oil in tank 27' is pumped out by the rotary feeding pump 78 to feed the hydraulic motor 1 with cold pressure oil. The pressure of this pressure oil corresponds to the output torque of the rotary oil motor 76. In this instance, when the piston 2 of the hydraulic motor 1 is displaced rapidly, the rotary oil motor 76 revolves rapidly. The speed of oil motor 76 varies in proportion to the velocity of the piston 2, and when piston 2 stops, the motor 76 also stops. Thus, the pump 78 revolves to feed the hydraulic motor 1 with the necessary quantity of oil, and the pressure of the cold pressure oil is proportional to the pressure of the hot pressure-oil established by relief valve 7.

As referred to above, the present invention is capable of perfectly removing the important inconveniences resulting from the temperature rise of the working pressure oil in the conventional oil pressure apparatus, because in the apparatus of the invention, only the necessary quantity of cold pressure oil of predetermined pressure is supplied to the hydraulic motor by its specific oil pressure convertor. Further, in the above description, the hydraulic motors 1, 1a and 1b refer to all the devices operated by oil pressure generally, such as oil pressure cylinders, oil pressure rotating motors and so forth.

What is claimed is:

1. A hydraulic motor control circuit comprising at least two oil pressure convertors each including a pressure operated device and a pressure oil feeding device directly driven by said pressure operated device, a pressure fluid source with a relief valve for supplying the pressure operated devices with fluid, a separate heat insulated reservoir for cold oil, said pressure oil feeding devices being coupled to the cold oil reservoir and being operated to feed at least one hydraulic motor with cold pressure oil pumped from said cold oil reservoir, the pressure of said cold oil being established only by the pressure of the pressure fluid for said pressure operated devices, at least one of said pressure operated devices working alternately without interruption and constantly driving the associated pressure oil feeding device in order to supply a necessary quantity of said cold pressure oil in response to the requirement of said hydraulic motor.

2. A hydraulic motor control circuit as claimed in claim 1 wherein each said pressure operated device is a cylinder with a piston slidably mounted in the cylinder for a working stroke, the circuit further comprising means to insure continuous working of said pressure operated device without interruption including a limit switch located in the middle of the advance stroke of the piston of one of said pressure operated devices, said limit switch serving to cause the retreat of the piston of the other pressure operated device.

3. A hydraulic motor control circuit as claimed in claim 1, wherein one of said oil pressure convertors is utilized as an auxiliary oil pressure convertor in order to supply said cold pressure oil continuously without surge during the change-over period of said pressure operated devices.

4. A hydraulic motor control circuit as claimed in claim 1, wherein compressed air is utilized as an operating pressure fluid in said pressure operated device.

5. A hydraulic motor control circuit comprising at least one oil pressure convertor including a double acting pressure oil feeding device, a main pressure operated device connected adjacent said oil feeding device on one side thereof to drive the same and an auxiliary pressure operated device connected adjacent said oil feeding device on the other side thereof, said pressure oil feeding device being heat-insulated from said two adjacent pressure operated devices, a pressure fluid source including a pressure controlling valve for supplying said two adjacent pressure operated devices with a pressure fluid, a separate heat-insulated reservoir for cold pressure oil, said pressure oil feeding device being operated to feed continuously at least one hydraulic motor with cold pressure oil pumped from said cold oil reservoir, said auxiliary pressure operated device being coupled to said cold oil reservoir and serving to supply a necessary quantity of said cold pressure oil continuously without surge in response to the requirement of said hydraulic motor during the change-over period of said main pressure operated device.

6. A hydraulic motor control circuit comprising at least one oil pressure convertor consisting of a rotary oil motor and a pressure oil feeding rotary pump directly driven by said rotary oil motor, said rotary oil motor being supplied from a pressure oil source through a relief valve, a separate heat-insulated reservoir for cold pressure oil, said pressure oil feeding rotary pump being operated to feed continuously at least one hydraulic motor with a necessary quantity of cold pressure oil pumped from said cold oil reservoir in response to the requirement of said hydraulic motor.

References Cited
UNITED STATES PATENTS

| | | | |
|---|---|---|---|
| 2,274,224 | 2/1942 | Vickers | 103—49 |
| 2,499,563 | 3/1950 | Bill | 60—54.5 X |
| 2,528,131 | 10/1950 | Garretson | 103—49 |
| 2,813,398 | 11/1957 | Wilcox | 60—51 |
| 2,938,347 | 5/1960 | Sturgis | 60—52 |
| 3,022,738 | 2/1962 | Krute | 103—49 |

EDGAR W. GEOGHEGAN, *Primary Examiner.*